W. SMITH.
Car Wheel.

2 Sheets—Sheet 1.

No. 26,821.

Patented Jan. 10, 1860.

Witnesses:
Martin G. Carling
W. Bakewell

Inventor:
Wm Smith

W. SMITH.
Car Wheel.

No. 26,821.

2 Sheets —Sheet 2.

Patented Jan. 10, 1860.

Witnesses:
Martin G. Carling.
W. Bakewell.

Inventor:
Wm Smith.

UNITED STATES PATENT OFFICE.

WM. SMITH, OF PITTSBURG, PENNSYLVANIA, ASSIGNOR TO HIMSELF AND SMITH PARK & CO., OF SAME PLACE.

RAILROAD-CAR WHEEL.

Specification of Letters Patent No. 26,821, dated January 10, 1860.

*To all whom it may concern:*

Be it known that I, WILLIAM SMITH, of the city of Pittsburg, in the county of Allegheny and State of Pennsylvania, have invented a new and useful Improvement in Railroad-Car Wheels; and I do hereby declare the following to be a full, clear, and exact description thereof, reference being had to the annexed drawing, forming part of this specification, in which—

Figure 1:
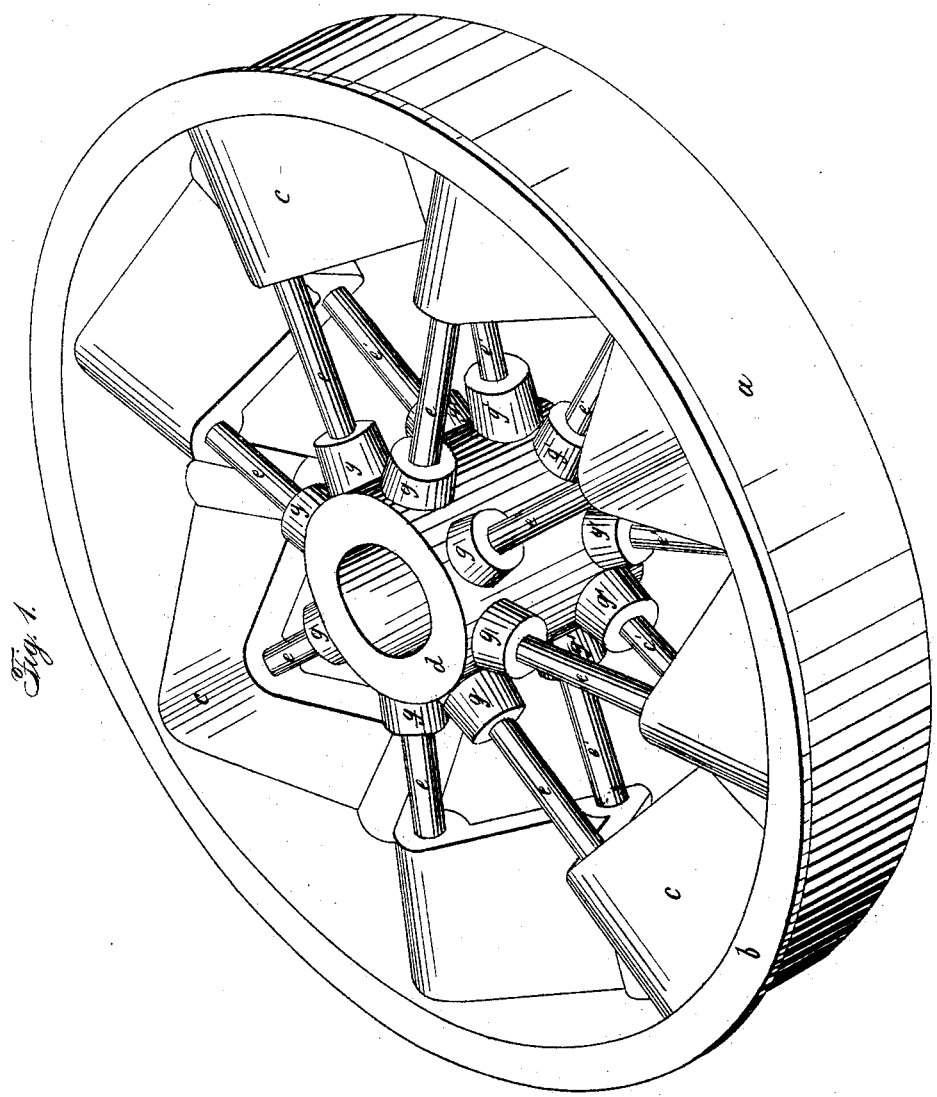
Figure 2:
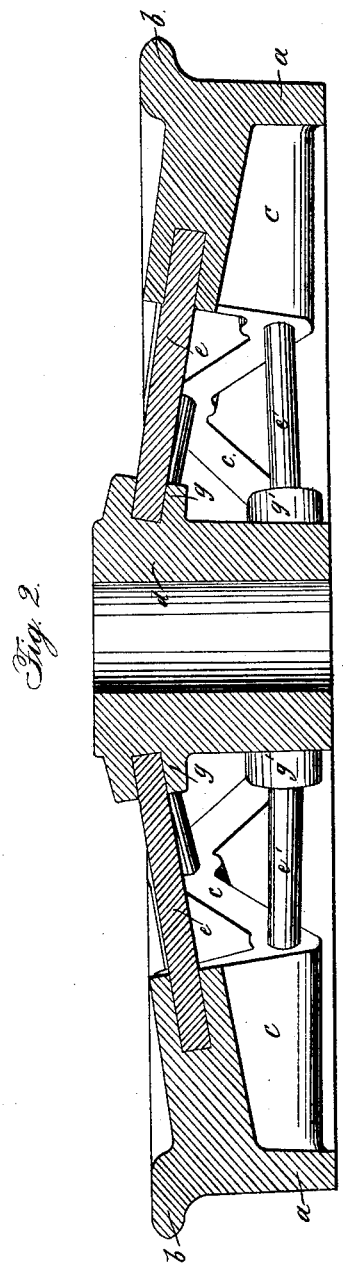

Figure 1, is a perspective representation of my improved car wheel. Fig. 2, is a diametrical section of my improved car wheel, showing the parts back of the plane of section in perspective.

In both figures like letters of reference denote similar parts.

In my improved car wheel, the hub, rim, flange, and rim plate, are of cast iron, while the spokes which unite the hub with the rim plate, are of wrought iron; and my improvement is designed to overcome the usual defect in cast iron wheels arising from the unequal shrinkage of the metal in cooling after casting, and to equalize the pressure of the spokes on the rim of the wheel, thereby increasing the strength of the wheel, and preventing the liability to break, arising from its being hide-bound or contracting more at the circumference, than nearer the center.

In manufacturing cast iron car wheels, it is found difficult to prevent their cracking at the rim, while the iron is cooling, and if, by the exercise of great caution, they cool without fracture, they are constantly liable to break when in use, because there being more iron in the rim, than in any other part, it will have contracted more, and the consequence is, that the wheel will give way, with a jar or strain, which would not injure it, if the contraction of the metal were uniform throughout. This liability of cast iron wheels to break, is a fruitful source of accident, and various plans have been devised to give the wheel such a shape, as to remedy this defect, and allow of the contraction of the rim in cooling, and the subsequent expansion and contraction of the iron by heat and cold arising from change of atmospheric temperature, or other causes, without danger of breakage or cracking.

In order to enable others skilled in the art to construct and use my improved wheel, I will proceed to describe its construction, and the mode of manufacturing it.

In the drawing $a$ is the rim of the wheel of the usual shape and size, having on its inner edge a projecting flange $b$ as usual. Inside of this rim, and cast in one piece with it, is the rim plate $c$. This rim plate extends in width or depth, from the under surface of the rim all around it, not quite half way to the outer circumference of the hub $d$. This rim plate $c$ is of a curved or sinuous shape, as shown in the drawings, forming a succession of angles, so that the outer edge of the rim plate curves backward and forward between the inner and outer edge of the under side of the rim $a$ of the wheel. The angles of the iron plate $c$ at its contact with the rim, or its outer edge, are right angles or nearly so, while at the inner edge, (nearer the hub) the angles are more acute, the length of the inner and outer edges of the rim plate following its sinuations, being equal. This gives, of course, an equal quantity of metal in the rim plate, throughout its width or depth, so that the shrinkage is the same throughout. The length of the edges of the rim plate, following its windings, is also equal or nearly so to the periphery of the outside of the rim or tread of the wheel, so as to equalize the shrinkage of the rim of the rim plate. At each of the angles of the sinuous rim plate $c$ the thickness of the iron is increased to allow the reception of the outer extremity of the spokes $e$, $e'$, one spoke $e$ or $e'$ entering the rim plate $c$, at each angle, as seen in Fig. 1.

The hub $d$ is of cast iron, and is cylindrical, having a circular projection at each point, where a spoke is inserted into the hub, as seen in Fig. 2. The inner extremity of each spoke is seated in one of these circular projections $g$, but does not weaken the hub by entering farther toward the center than the height of the projection $g$, thus detracting nothing from the hub itself, but leaving it solid to the full thickness of the cylinder. Of the projection $g$ on the hub, one half are situate near the inner edge of the hub, and the other half $g'$ near the outer edge: these are situate alternately, and equidistant from each other around the hub. The inner spokes $e$ extend from near the inner edge of the hub, to an angle of the sinuous rim plate *c* near the inner edge of the rim *a*, and the outer spokes *e'* (which alternate with the inner spokes *e*) extend from near the outer edge of the hub, to an angle in the sinuous rim plate *c* near the outer edge of the rim. The outer spokes *e' e'* &c, are set radiating from the center of the wheel, nearly parallel to the plane of the outer face of the wheel, but the inner spokes *e e* incline, to correspond with the dish of the inner face of the wheel, so that the pressure of the inner spokes *e e* shall not be against the base of the flange *b*, but on the rim near the point of union between it and the flange (as seen in Fig. 2). By this arrangement, the pressure of the spokes does not bear with undue force against any particular part of the rim, but by means of the sinuations of the rim-plate, which receives the outer extremities of the spokes, is equalized over the whole circumference and width of the rim.

To insure the successful operation of my wheel, I will explain the mode in which it is cast.

The wheel being molded in the sand, and the wrought iron spokes being placed in their proper position, with their extremities projecting into the cavities left in the mold for the hub, and rim, the melted metal is first run into the cavity forming the rim and flange. It is then left to cool, for three or four hours, during which time, the rim and flange, and sinuous rim plate contract, and in so doing, press the spokes in toward the center: the hub not being yet cast, this drawing in of the spokes, has no injurious effect, as it would have, if the hub were cast at the same time as the other parts of the wheel. When the rim, flange and rim plate, are sufficiently cool, the hub is cast, which being a comparatively small cylinder, is not liable to crack in cooling, not being affected by the contraction of the outer parts of the wheel.

I do not claim the use of wrought iron spokes in railroad car wheels, nor their use in connection with cast iron rims and hubs, but What do I claim as my invention, and desire to secure by Letters Patent, is—

1. Making railroad car wheels having cast iron rims and hubs, with a rim plate, either sinuous, or otherwise, extending around and underneath the rim, the hub and rim being connected by wrought iron spokes, placed alternately at the outer and inner face or edge of the rim and hub, in the manner hereinbefore described, for the purpose of distributing the bearing or pressure of the spokes, so as to make it equal on both edges of the rim and hub.

2. Making the cast iron rim of railroad car wheels, with a sinuous rim plate, cast in one piece with the rim, and extending around the inner face of the rim; the rim plate being so shaped, that both of its edges (following its windings) are of equal length to each other, and also to the circumference of the outer face or tread of the wheel, for the purpose of securing an equal degree of contraction of the rim and rim plate, and at the same time, strengthening and bracing the rim, and supporting the strain of the wrought iron spokes.

3. Also the combination in railroad car wheels, of a cast iron rim, having a waving or sinuous rim-plate around its under or inner circumference, with a cast iron hub, connected with the rim plate and rim by means of wrought iron spokes arranged alternately near the inner and outer face of the wheel, substantially in the manner hereinbefore described.

In testimony whereof, the said WILLIAM SMITH has hereunto set his hand.

WM. SMITH.

In presence of—
MARTIN G. CUSHING,
W. BAKEWELL.